(12) United States Patent
Chencinski et al.

(10) Patent No.: US 8,582,778 B2
(45) Date of Patent: Nov. 12, 2013

(54) INTEGRATED KEY SERVER

(75) Inventors: Edward W. Chencinski, Poughkeepsie, NY (US); James R. Coon, Rochester, MN (US); John C. Dayka, New Paltz, NY (US); Steven G. Glassen, Wallkill, NY (US); Richard J. Gusefski, Endicott, NY (US); Michael J. Jordan, Woodstock, NY (US); Marco Kraemer, Sindelfingen (DE); Thomas B. Mathias, Vestal, NY (US); Peter K. Szwed, Rhinebeck, NY (US); Garry J. Sullivan, Rochester, MN (US); Klaus Werner, Moetzingen (DE)

(73) Assignee: International Business Machines Corporation, Armonk, NY (US)

( * ) Notice: Subject to any disclaimer, the term of this patent is extended or adjusted under 35 U.S.C. 154(b) by 117 days.

(21) Appl. No.: 13/150,420

(22) Filed: Jun. 1, 2011

(65) Prior Publication Data

US 2012/0308011 A1    Dec. 6, 2012

(51) Int. Cl.
  *G06F 21/00*    (2013.01)
(52) U.S. Cl.
  USPC ............................... 380/278; 726/9; 713/284
(58) Field of Classification Search
  USPC ............................... 380/278; 726/9; 713/284
  See application file for complete search history.

(56) References Cited

U.S. PATENT DOCUMENTS

| 2001/0156501 | | 8/2004 | Zuili | |
|---|---|---|---|---|
| 2007/0106911 | A1* | 5/2007 | Mishra et al. | 380/281 |
| 2010/0131968 | A1 | 5/2010 | Newell et al. | |

FOREIGN PATENT DOCUMENTS

| CN | 1574733 A | 2/2005 |
|---|---|---|
| CN | 101739758 A | 6/2010 |

OTHER PUBLICATIONS

International Search Report of the International Searching Authority for Application No. PCT/IB2012/052413; Date of Mailing Sep. 13, 2012.
Written Opinion of the International Searching Authority for Application No. PCT/IB2012/052413; Date of Mailing Sep. 13, 2012.

* cited by examiner

*Primary Examiner* — Brandon Hoffman
*Assistant Examiner* — Thong Truong
(74) *Attorney, Agent, or Firm* — Cantor Colburn LLP; Steven Chiu (57) ABSTRACT

A computer program product for integrated key serving is provided. The computer program product includes a tangible storage medium readable by a processing circuit and storing instructions for execution by the processing circuit for performing a method. The method includes using a smart card of two or more smart cards with a support element of two or more support elements to create an encryption key and storing the encryption key in an encrypted file that can only be decrypted by the smart card and the support element used to create the encryption key.

20 Claims, 7 Drawing Sheets

INTEGRATED KEY SERVER

BACKGROUND

The present invention relates to an integrated key server and, more specifically, to an integrated key server for use with a computing system.

Data stored on a removable storage device can be protected from unauthorized access by encryption such that a system attempting to access encrypted data must have an encryption or authentication key related to the key used for the encryption. In the case of symmetric encryption, the same key is used for encryption and decryption. In the case of asymmetric encryption (e.g., RSA), a public key is used for encryption, and a separate private key is used for decryption.

SUMMARY

According to one embodiment of the present invention, a computer program product for integrated key serving is provided. The computer program product includes a tangible storage medium readable by a processing circuit and storing instructions for execution by the processing circuit for performing a method. The method includes using a smart card of two or more smart cards with a support element of two or more support elements to create an encryption key and storing the encryption key in an encrypted file that can only be decrypted by the smart card and the support element used to create the encryption key.

A method is provided and includes using a smart card of two or more smart cards with a support element of two or more support elements to create an encryption key and storing the encryption key in an encrypted file that can only be decrypted by the smart card and the support element used to create the encryption key.

A system for integrated key serving is provided and includes a smart card of two or more smart cards and a support element of two or more support elements, the smart card being installable into and removable from the support element to create an encryption key to be stored in an encrypted file such that the encryption key can only be decrypted by the smart card and the support element used to create the encryption key.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Data security is of paramount importance in enterprise computing. Whenever sensitive customer data is retained on a removable, persistent storage medium such as a flash drive or a DVD or hard drive or other removable media, the data must be key-encrypted to prevent unauthorized access. This is particularly true given the characteristic persistence of flash memory that is removable and portable whereby data persists in the memory even when power is unavailable. Indeed, when the medium is removed and later reattached to a system, a mechanism is required to validate the authority of the system to decrypt the data. This mechanism should be integrated within the system with no need for customer intervention.

Aspects of the present invention relate to the provision of end-to-end management of encryption-keys within an enterprise computing system. The key management is handled by a potentially mirrored system Support Element (SE) using the encryption capabilities of SE-attached smart cards. Data security is provided through protocols that ensure the combination of the smart card and SE on a system is authorized to serve the key as required in order to decrypt encrypted data.

Figure 1:
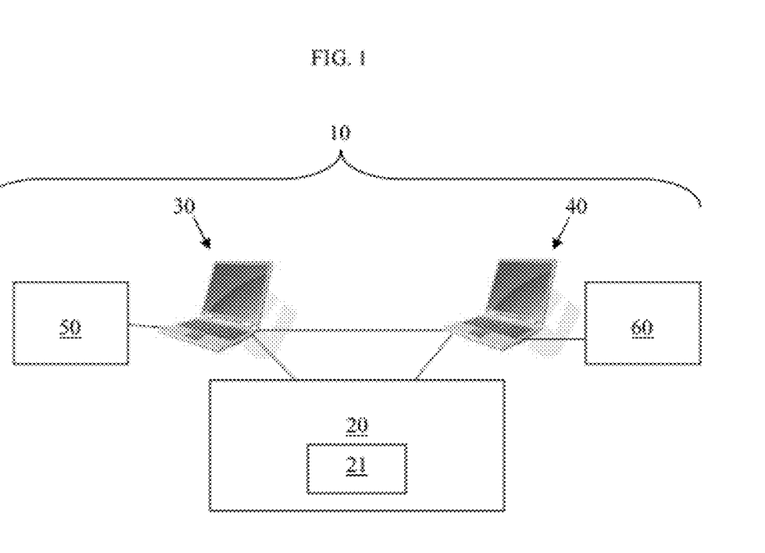
FIG. 1 is a schematic diagram of an enterprise computing system.

With reference now to FIG. 1, an enterprise computing system 10 is provided. The system 10 includes a main computing system 20, which may include a network of computing devices, such as personal computers, personal digital assistants and servers communicating with one another over a wired or wireless network. The main computing system 20 may also include, for example, a device 21, such as a flash memory card or other removable device, the encryption key is protecting data on. The computing devices, in particular, may include a primary SE 30 and a secondary SE 40. The system 10 further includes primary and secondary smart cards 50 and 60. The primary and secondary smart cards 50 and 60 include a public/private key pair and Key-Encrypting-Key (KEK), which persist in the absence of a power supply. The primary and secondary smart cards 50 and 60 are associated with the primary and secondary SEs 30 and 40, respectively.

When the system 10 transparently secures customer data, the system 10 may be considered to have acted without customer intervention. In such cases, the system 10 must obtain a key for use in either encrypting or authenticating access to the data but the generation, storage, and delivery of such a key (or keys) must not allow for unauthorized access. Also, the key management resources and algorithms of the system 10 must be tolerant of hardware failures such that, when secured data is migrated to another system, the corresponding key (or keys) may be migrated as well. Also, the key (or keys) must be able to be changed periodically.

In accordance with embodiments of the present invention, an integrated key server is executed on a system SE (i.e., the primary SE 30) using a smart card (i.e., primary smart card 50) to create encryption keys for use by the system 10 in securing customer data on the device 21. The keys are stored by the SE 30 in an encrypted key file that can only be decrypted by the smart card 50 and the SE 30 used to create it. When the enterprise computing system 10 initializes, the keys are decrypted from the key file and securely passed from the SE 30 to the enterprise computing system 10. Further embodiments of the invention include mirroring the key server function across multiple SE's (i.e., the primary SE 30 and the secondary SE 40) to thereby make the system 10 tolerant of an SE failure, changing one or more of the generated keys and securely migrating one or more of the keys to a new system to follow migrated data secured with one or more of the keys.

In an embodiment, the SE 30 may include a physically locked-down laptop computer and an integrated card reader into which the smart card 50 may be inserted. When an SE is "locked down," popping of the smart card 50 is not an option unless the person doing the removal has the physical key to the physical lock.

The SE 30 may or may not be connected to the system 10 via a secure communications line. The system 10 has a code component, such as an Input/Output Processor (IOP), which manages the protection of data. During a Power-On-Reset (POR), the IOP code generates and sends a public key to the SE 30 for use in wrapping the encryption key while in transit between the SE 30 and the enterprise computing system 10. Then, IOP code uses its private key to decrypt the wrapped encryption key. The IOP code will then use the encryption key to access data on the device 21.

To start, key management code on the SE 30, which is referred to as an Integrated Key Controller (IKC), invokes a procedure to create the encryption key and store the encryption key in a file on the SE 30. The file contents are the encrypted encryption key and the serial number of the SE 30. In addition, the entire file is encrypted using a public key generated by the smart card 50. This is necessary in order to determine at a later time if the key file is tightly coupled with the smart card 50. The process of verification that a key file is associated with the smart card 50 involves invoking a procedure on the smart card 50 with the encrypted contents of the file and the serial number of the SE 30. The smart card 50 decrypts the file contents with a private key of the smart card 50 and compares the serial number of the SE 30 provided on the interface to the serial number in the decrypted file contents.

As mentioned above, there are at least two SEs in this environment: the primary SE 30 and one or more alternates, such as the secondary SE 40. The primary and secondary SEs 30 and 40 are or may be connected by a wired or wireless communications link by way of the system 10. The primary SE 30 handles the key requests from IOP code and, if the primary SE 30 fails, the secondary SE 40 takes over and becomes the new primary. Once the failing primary comes back up, it then takes on the role of an alternate or secondary SE. Each of the primary and secondary SEs 30 and 40 has its own encrypted key file and has a unique association between the encrypted key file and the smart card 50 (or 60) by virtue of the SE serial number and the smart card public key used to encrypt the key file.

Figure 2:
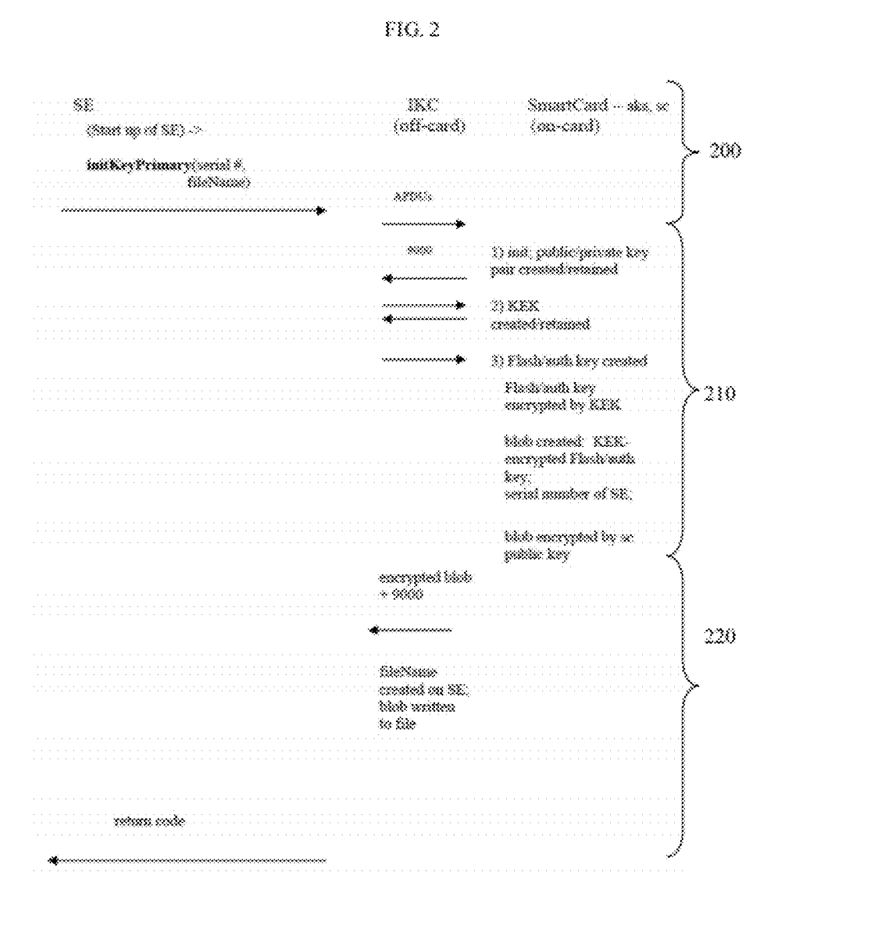
FIG. 2 is a flow diagram illustrating an initialization of a primary support element.

With reference to FIG. 2, initialization of the primary SE 30 with the primary smart card 50 will be explained. The process involves the IKC code loading an initialization applet (i.e., smart card executed code) and invoking the initialization applet with the serial number of the primary SE 30. The applet code creates a public/private key pair retained on the primary smart card 50 with the public key being exportable, a symmetric KEK, which is also retained on the smart card and exportable, a symmetric encryption key, which is encrypted by the KEK and not retained on the primary smart card 50 and a composite file (blob), which is encrypted by the public key of the primary smart card 50. The composite file includes the KEK-encrypted flash memory encryption key/authentication key and the serial number of the primary SE 30.

As shown in FIG. 2 and subsequent figures, arrows originating from the SE to the IKC are Application Program Interface (API) calls and arrows returning to the SE from the IKC are responses. Some responses contain data and others just contain a return code. Arrows originating from the IKC to the smart cards represent Application Protocol Data Units (APDUs) and, in particular, command APDUs. Arrows returning from the smart card to the IKC are response APDUs. Data above an APDU arrow is data passed with the APDU.

In FIG. 2, the initKeyPrimary API is called with the serial number of the primary SE 30 and a file name. The IKC processes this API call by sending command APDUs to the primary smart card 50 passing the serial number as data. Upon receiving the command APDUs, the primary smart card 50 creates a public/private key pair and retains it, creates a KEK and retains it, creates a flash/authentication key which is not retained and encrypts it with the KEK, creates a blob consisting of the KEK-encrypted flash/authentication key and the serial number of the SE and encrypts that blob with the retained public key (210). The blob is sent back to the IKC which then creates a file with the name passed from the primary SE 30 and writes the encrypted blob to the file on the primary SE 30. The IKC then sends a return code back to the primary SE 30. (220) As noted above, the flash/authentication key is a symmetric encryption key, which is encrypted by the KEK and not retained on the primary smart card 50. The blob is a composite file, which is encrypted by the public key of the primary smart card 50 and includes the KEK-encrypted flash/authentication key and the serial number of the primary SE 30.

The operations of FIG. 2 as well as those of FIGS. 3-7 describe interactions between SE code and the IKC code and interactions between the IKC and the smart card(s). The IKC sends commands to the smart card(s) via the APDUs with responses from the smart card(s) being any data plus a code of, for example, 0x9000 if the data is good and, otherwise, with the responses being for example one of many 2-byte negative return codes.

Figure 3:
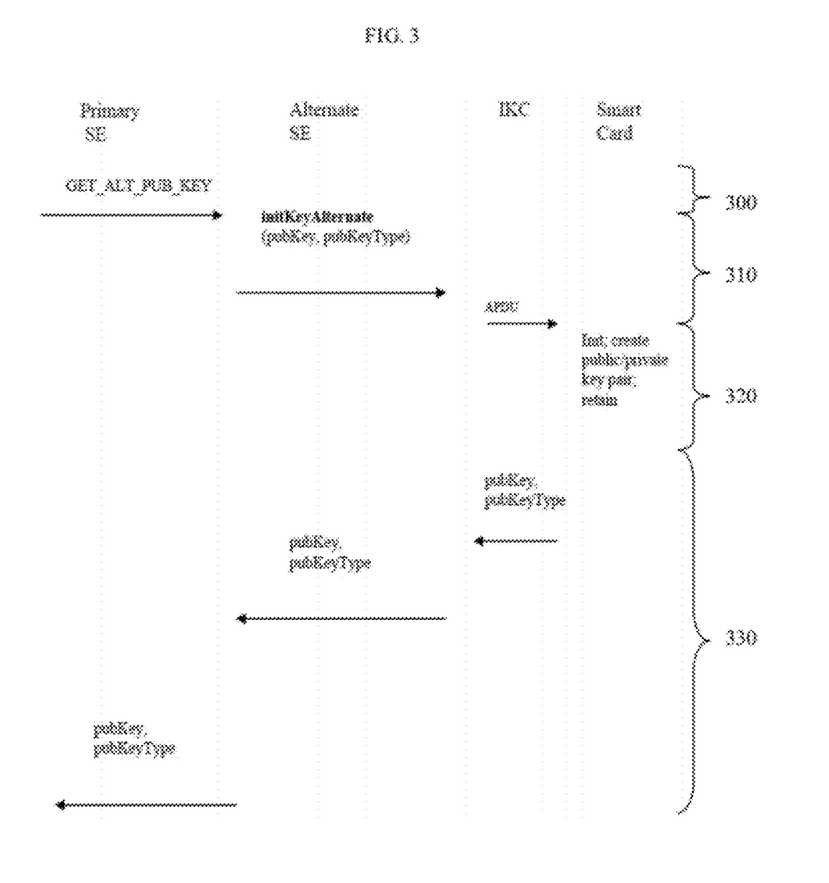
FIG. 3 is a flow diagram illustrating an initialization of a secondary support element.
Figure 4:
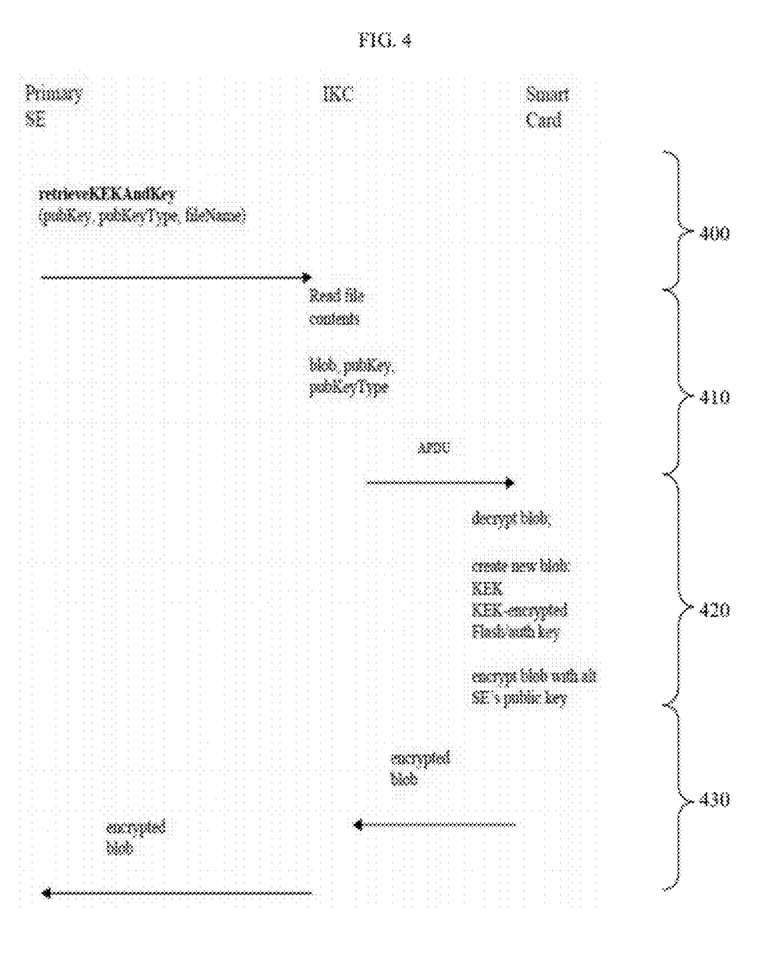
FIG. 4 is a flow diagram illustrating key retrieval in the initialization of the primary support element.
Figure 5:
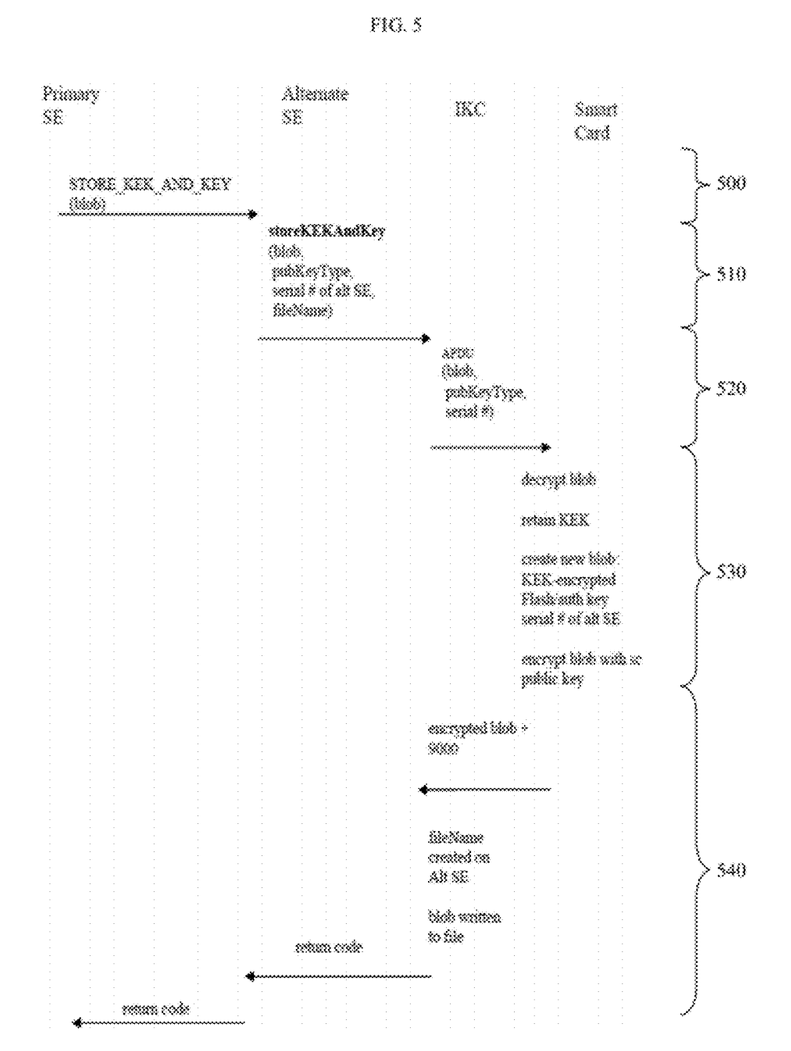
FIG. 5 is a flow diagram illustrating key storage in the initialization of the primary support element.

With reference to FIGS. 3-5, initialization of the secondary SE 40 is shown. The application programming interfaces (APIs) for this sequence are initKeyAlternate, retrieveKEKAndKey and storeKEKAndKey with the sequence being initiated from the primary SE 30. The purpose of the first API in the sequence is to initialize the secondary smart card 60 on the secondary SE 40 with applet code and to create another public/private key pair. The API will thus return the public key of the secondary smart card 40 associated with the secondary SE 40. This public key is used in the second API to encrypt the KEK and the KEK-encrypted flash/authentication key in order to send the resulting blob back to the secondary SE 40 for redundancy.

As shown in FIG. 3, the primary SE 30 with the primary smart card 50 installed therein sends a GET_ALT_PUB_KEY request to the secondary SE 40 having the secondary smart card 60 installed therein (300). The secondary SE 40 responds by calling the IKC with the initKeyAlternate API. The IKC sends a command APDU to the secondary smart card 60. The secondary smart card 60 then creates its own public/private key pair, which is retained on the secondary smart card 60 (320). The public key and public key type and are then sent back to the IKC, the secondary SE 40 and the primary SE 30 in turn (330).

The second API in the initialization sequence retrieves the KEK and the encryption key from the primary SE 30, encrypts them into a blob using the public key of the secondary SE 40 and sends the blob to the secondary SE 40.

That is, with reference to FIG. 4, the primary SE 30 sends a retrieveKEKAndKey request to the IKC, which includes the public key of the secondary SE 40, its public key type and a file name (400). The IKC then reads the file contents to extract the encrypted blob. The IKC then sends the blob, the secondary SE 40 public key and its public key type to the primary smart card 50 by way of APDUs (410). The primary smart card 50 then decrypts the blob using the primary smart card 50 private key, creates a new blob including the KEK and the KEK-encrypted flash/authentication key and encrypts the blob with the secondary SE public key (420). The new encrypted blob is then sent back to the IKC and the primary SE 30 in turn (430).

The third API in the initialization sequence (also initiated by the primary SE 30) stores the KEK and the KEK-encrypted flash/authentication key extracted from the primary SE 30 onto the secondary SE 40 and completes the initialization sequence. Initially, the API invokes the applet code on the secondary smart card 60 of the secondary SE 40 with the blob from the second initialization API, and the serial number of the secondary SE 40. The applet code decrypts the blob with the private key of the secondary smart card 60, stores the KEK on the secondary smart card 60 and returns a new blob to the IKC to be stored in a file. The new blob consists of the KEK-encrypted flash/authentication key and the serial number of the secondary SE 40 and is encrypted with the public key of the secondary smart card 60 of the secondary SE 40.

That is, with reference to FIG. 5, the primary SE 30 issues a STORE_KEK_AND_KEY request with an associated blob to the secondary SE 40 (500). The secondary SE 40 then issues a storeKEKAndKey command to the IKC (510). This command includes the associated blob, the secondary SE 40 public key type, the serial number of the secondary SE 40 and the file name. The IKC then passes the associated blob, the secondary SE 40 public key type and the serial number of the secondary SE 40 to the secondary smart card 60 (520) by way of APDUs. The secondary smart card 60 decrypts the blob, retains the KEK, creates a new blob including the KEK-encrypted flash/authentication key from the decrypted blob and the serial number of the secondary SE 40 and encrypts the blob with the public key of the secondary smart card 60 (530). The encrypted blob is then sent back to the IKC which then creates a file with the name passed to it by the secondary SE 40 on the API call, and writes the encrypted blob to the file. The secondary SE 40 then sends a return code to the primary SE 30 (540).

Figure 6:
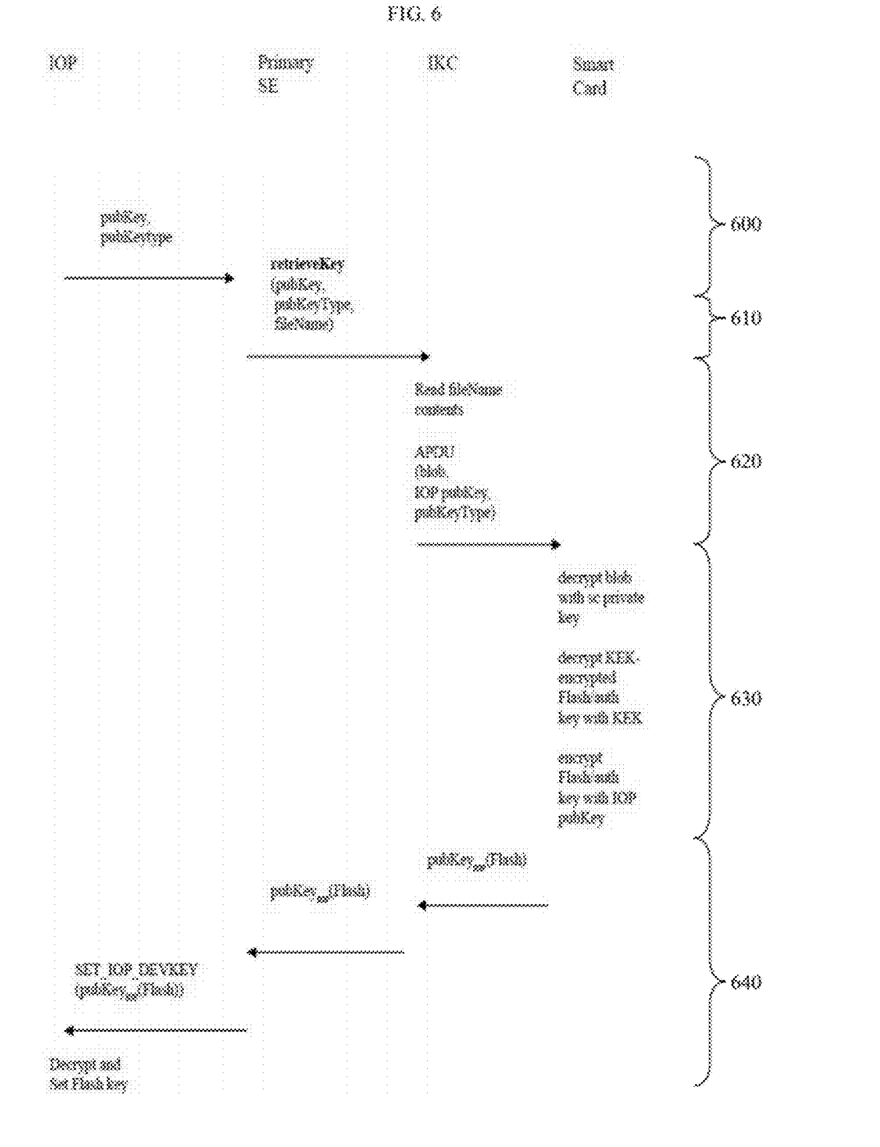
FIG. 6 is a flow diagram illustrating key serving.

For key serving operations, the key serving API is the interface used to securely serve the encryption keys from the SE 30 or 40 to the IOP. This is normally done only at system power-on time but, in accordance with embodiments, may be done at other predefined or selected times. The served encryption key is encrypted with the IOP public key passed to the SE 30 or 40 upon request by the IOP.

With reference to FIG. 6, the IOP issues to the primary SE 30 data including a public key and public key type (600) and the primary SE 30 then issues to the IKC a retrieveKey command (610). The retrieveKey command includes the public key, the public key type and the file name. The IKC reads the file contents, extracts the encrypted blob, and sends the blob, the public key and public key type to the primary smart card 50 by way of APDUs (620). The primary smart card 50 decrypts the blob with the primary smart card 50 private key, decrypts the KEK-encrypted flash/authentication key with the KEK and encrypts the flash/authentication key with the public key of the IOP (630). The encrypted flash/authentication key is then returned to the primary SE 30 which sends it on to the IOP. The IOP decrypts the encrypted key with its private key to establish the new flash/authentication key (640).

Figure 7:
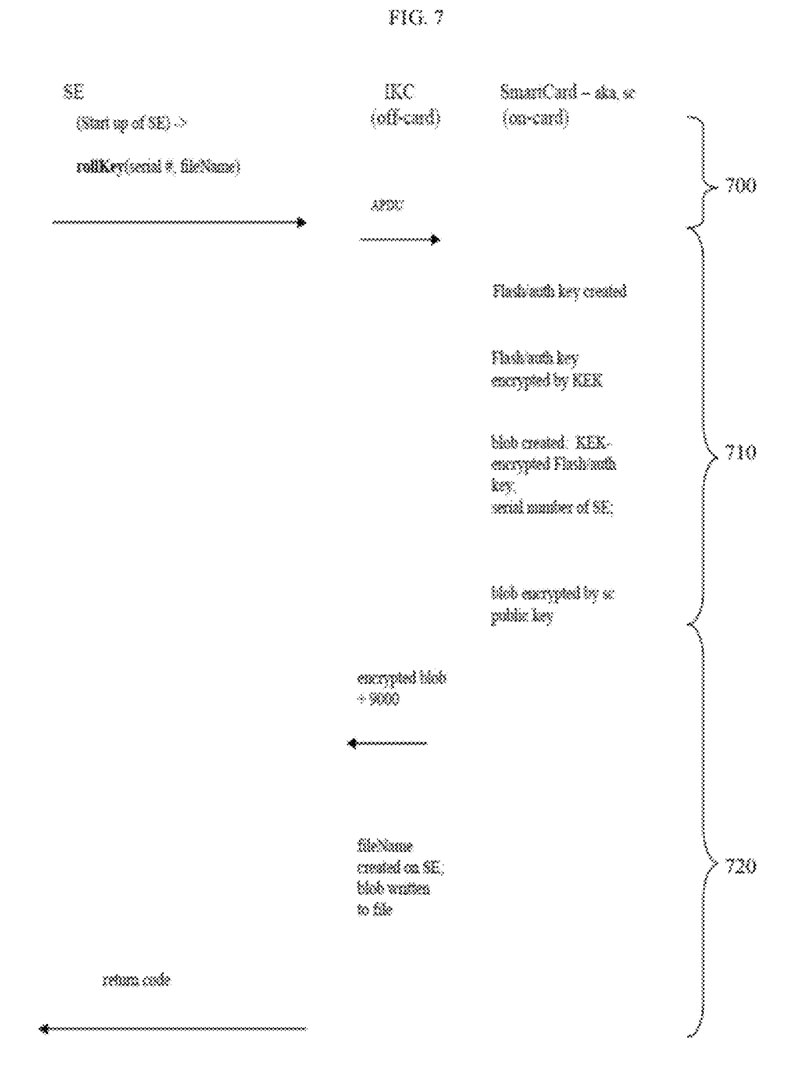
FIG. 7 is a flow diagram illustrating operations for changing an encryption key.

The change encryption key (rollKey) API provides an interface for changing or "rolling" the encryption key. This involves the primary SE 30 sending in the name of a file to hold the encrypted blob containing the new flash/authentication key along with the serial number of the primary SE 30. The applet generates a new flash/authentication key, encrypts it with the KEK, and then public-key-encrypts a blob including the KEK-encrypted flash/authentication key and the serial number of the primary SE 30. The blob is then written to the new file. To actually roll the key then, the primary SE 30 calls the retrieveKey( ) API in the IKC with the new file name and the flow sequence described by FIG. 6 is essentially followed in that the primary SE 30 will call the IKC twice passing in the public key of the IOP both times as well as the file name of the current key on the first call and the file name of the new key on the second call. When the first call is made to the IKC, the IKC reads the file contents to extract the blob and then sends the IOP public key and the blob to the smart card. The smart card decrypts the blob, decrypts the KEK-encrypted flash/authentication key, wraps the flash/authentication key with the IOP public key and sends it back to the IKC who sends it back to the primary SE 30. The second call to the IKC involves the same process with the file name of the new flash/authentication key. The primary SE 30 will then send both the new and current flash/authentication keys to the IOP, both individually wrapped in the IOP's public key. When the key "roll" is complete, the current flash/authentication key file is backed up and the new flash/authentication key file becomes the current key file.

With reference to FIG. 7, the primary SE 30 issues a rollKey command to the IKC (700), which sends a command APDU to the primary smart card 50. This command includes the primary SE 30 serial number. Next, a new flash/authentication key is created and encrypted by the KEK, a blob is created and includes the KEK-encrypted flash/authentication key and the serial number of the primary SE 30 and the blob is encrypted by the primary smart card 50 public key (710). The blob is returned to the IKC which creates a file with the name passed in on the API call and writes the encrypted blob to the file. The IKC sends a return code back to the primary SE 30 (720).

A mirroring API mirrors the key from the secondary SE 40 onto a new primary SE 30. The purpose of this API, initKeyMirrorOther( ), is to initialize a smart card on a new SE 30 with the applet code and to create a public/private key pair. It is invoked after a failing primary SE 30 comes back online The API returns the public key of the secondary smart card 60, which is to be associated with the new primary SE 30. This public key is used to encrypt the KEK and the KEK-encrypted flash/authentication key, sending the resulting blob from the secondary SE 40 back to the new primary SE 30. This API is the mirror of the initKeyOther API with the roles of the primary SE 30 and the secondary SE 40 reversed.

For export migration of encryption keys, the flash key file must be carried forward to a new system when the encrypted data is carried forward. This involves calling an API, storeFlashFileOnSmartCard, with the file name of the key file. The key file contents are read by the API and stored "as is" on the smart card. The key file named must be the one associated with the smart card. After this operation, the smart card, containing the key file, can then be brought forward to the new SE. For import migration, the key file on the smart card that is carried forward to a new system is restored on the new system with the new system's serial number embedded in the flash file. This involves calling an API, restoreFlashFileToSE, with the new file name of the key file and the serial number of the new SE. The stored key file contents are decrypted by the smart card applet code to allow insertion of the new serial number, and then re-encrypted by the public key of the smart card. The blob is returned to the off-card API code to be written to the file whose file name was passed in on the interface.

Technical effects and benefits of the present invention relate to the provision of end-to-end management of encryption-keys within an enterprise computing system. The key management is handled by a mirrored system support element (SE) using the encryption capabilities of SE-attached smart cards. Data security is provided through protocols that ensure the combination of the smart card and SE on a system is authorized to serve the key required to decrypt data from an attached storage medium.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a Random Access Memory (RAM), a Read-Only Memory (ROM), an Erasable Programmable Read-Only Memory (EPROM or Flash memory), an optical fiber, a portable Compact Disc Read-Only Memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a Local Area Network (LAN) or a Wide Area Network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for integrated key serving, the computer program product comprising:
    a non-transitory tangible storage medium readable by a processing circuit and storing instructions for execution by the processing circuit for performing a method, comprising:
    using a public key generated by a smart card of two or more smart cards with a support element of two or more support elements to create an encryption key; and
    storing the encryption key in an encrypted file, which is associated with a serial number of the support element,
    the storing being executed such that the encryption key can only be decrypted by a private key of the smart card and the support element used to create the encryption key as identified by the serial number thereof.

2. The computer program product according to claim 1, wherein the method further comprises:
    retrieving the encryption key; and
    securely transporting the retrieved encryption key from the support element to a computing system to which the support element is connected.

3. The computer program product according to claim 1, wherein the method further comprises initializing a secondary support element and a secondary smart card as alternates for the support element and the smart card.

4. The computer program product according to claim 1, wherein the method further comprises changing the encryption key.

5. The computer program product according to claim 1, wherein the method further comprises mirroring the encryption key.

6. The computer program product according to claim 1, wherein the method further comprises exporting the encryption key.

7. The computer program product according to claim 1, wherein the method comprises importing the encryption key.

8. A method for integrated key serving, comprising:
    using a public key generated by a smart card of two or more smart cards with a support element of two or more support elements to create an encryption key; and
    storing the encryption key in an encrypted file, which is associated with a serial number of the support element,
    the storing being executed such that the encryption key can only be decrypted by a private key of the smart card and the support element used to create the encryption key as identified by the serial number thereof.

9. The method according to claim 8, further comprising:
    retrieving the encryption key; and
    securely transporting the retrieved encryption key from the support element to a computing system to which the support element is connected.

10. The method according to claim 8, further comprising initializing a secondary support element and a secondary smart card as alternates for the support element and the smart card.

11. The method according to claim 8, further comprising changing the encryption key.

12. The method according to claim 8, further comprising mirroring the encryption key.

13. The method according to claim 8, further comprising exporting the encryption key.

14. The method according to claim 8, further comprising importing the encryption key.

15. A system for integrated key serving, comprising:
    a smart card of two or more smart cards, the smart card having a private key and being configured to generate a public key; and
    a support element of two or more support elements,
    the smart card being installable into and removable from the support element to create an encryption key to be stored in an encrypted file, which is associated with a serial number of the support element,
    the storing of the encrypted file being executed such that the encryption key can only be decrypted by the private key of the smart card and the support element used to create the encryption key as identified by the serial number thereof.

16. The system according to claim 15, wherein the encryption key is retrievable and securely transportable from the support element to a computing system to which the support element is connected.

17. The system according to claim 15, further comprising a secondary support element and a secondary smart card to be initialized as alternates for the support element and the smart card.

18. The system according to claim 15, wherein the encryption key is changeable.

19. The system according to claim 15, wherein the encryption key is configured to be mirrored.

20. The system according to claim 15, wherein the encryption key is exportable and importable.

* * * * *